United States Patent Office 3,026,336
Patented Mar. 20, 1962

3,026,336
PROCESS FOR THE MANUFACTURE OF
ALLOPREGNANES
Albert Wettstein, Riehen, and Karl Heusler, Basel, Switzerland, assignors to Ciba Pharmaceutical Products Inc., Summit, N.J.
No Drawing. Filed Dec. 23, 1959, Ser. No. 861,447
Claims priority, application Switzerland Dec. 24, 1958
6 Claims. (Cl. 260—397.4)

The present invention provides a process for the manufacture of 16α-alkyl-17α-hydroxy-allopregnane-20-ones from $\Delta^{5,16}$-pregnadiene-20-ones, and is concerned more especially with the selective hydrogenation of the 5:6-double bond in 20-enol acylates of $\Delta^5$-16α-alkyl-pregnene-20-ones. The 16α-alkyl-17α-hydroxy-allopregnane-20-ones are important intermediates for the synthesis of corticosteroids containing a 16α-alkyl radical such, for example, as 16α-methyl-9α-fluoro-prednisolone and prednisone, as well as of 16α-methyl-17α-hydroxy-progesterone, and of esters of these compounds.

Among the pregnane compounds used industrially for the manufacture of corticoid hormones, the $\Delta^{5,16}$-3β-hydroxy-20-oxo-pregnadiene (16 - dehydro-pregnenolone) obtained from diosgenin, and its esters, are of special importance owing to their ready accessibility.

That is the reason why said compound has been used as starting material in the synthesis of the highly active 16α-methyl-9α-fluoro-prednisolone. In the first stages of this synthesis 16-dehydro-pregnenolone acetate is reacted with methyl-magnesium iodide to yield 16α-methyl-pregnenolone acetate; the 5:6-double bond is then hydrogenated, the 20-enol acetate is prepared and oxidised with peracid; and the resulting 20-acetoxy-17:20-epoxide is hydrolysed to form 3β:17a-dihydroxy-16α-methyl-allopregnane-20-one. The yields obtained in this process—both in the introduction of the 16α-methyl group and more especially in the preparation of the 20-enol acetate—amount only to about 40 to 60%, and the isolation of by-products and starting material is difficult and requires in most cases chromatographic operations.

The present invention is based on the observation that the conversion of 16-dehydro-pregnenolone and of its esters to 3β:17α-dihydroxy-16α-alkyl-allopregnane-20-one can be carried out with a high yield and by way of a uniform reaction when a $\Delta^{5,17(20)}$-3β:20-diacyloxy-16α-alkyl-pregnadiene, prepared from 16-dehydro-pregnenolone or from an ester thereof, is hydrogenated in the presence of a noble metal catalyst, the hydrogenation product is treated with an organic per-acid and the resulting oxidation product is hydrolysed.

The $\Delta^{5,17}$-3:20-diacyloxy-16α-alkyl-pregnadienes used as starting materials are obtained from 16-dehydro-pregnenolone or a 3-ester thereof by the process described in our patent application Serial No. 845,078 filed October 8, 1959, by Albert Wettstein et al. in a yield of 90 to 95%. According to that process 16-dehydro-pregnenolone or a 3-ester thereof is reacted with an alkyl-metal compound, preferably with methyl-magnesium iodide, and the metal enolate thus formed is treated with an acylating agent. The 3:20-diacylates contain in positions 3 and 20 two identical or two different acyl groups derived from aliphatic, araliphatic, aromatic or heterocyclic carboxylic acids, such as lower fatty acids, for example formic acid, acetic acid, propionic acid, butyric acid, valeric acid, caproic acid, oenanthic acid, caprylic acid, phenylacetic acid, para-nitrophenylacetic acid, benzoic acid, para-methoxybenzoic acid, 2:4:6-tribromo-benzoic acid, or furan-2-carboxylic acid.

It is surprising that in these $\Delta^{5,17(20)}$-3:20-diacyloxy-16α-alkyl-pregnadienes the 5:6-double bond is easy to hydrogenate selectively, and a high yield of the corresponding allopregnenes is obtained without attack upon the enol double bond. The selective hydrogenation is advantageously performed with a noble metal catalyst, more especially palladium in the form of palladium carbon or on a support such as calcium carbonate, strontium carbonate, barium sulfate, zinc oxide or animal carbon, in an inert solvent such as an alcohol, for example methanol, ethanol, propanol, or in an ether such as tetrahydrofuran or dioxane. The calculated amount of hydrogen is taken up even at room temperature and under atmospheric pressure within a short time, which can be shortened by adding a small proportion of an acid, such as perchloric, oxalic or other acids. The hydrogenated enol acetate can in many cases be obtained in crystalline form.

The oxidation of the hydrogenated enol acetate is carried out in an as such known manner with an organic per-acid, for example with peracetic, perbenzoic or monoperphthalic acid. It has, however, been observed that the oxidation of the 16α-alkyl compounds progresses much more slowly than that of the 16-unsubstituted 20-enol acylates. The epoxides formed can be hydrolysed with acid or with alkaline agents, for example with dilute sulfuric acid, or with a bicarbonate, carbonate or hydroxide of an alkali metal, and also with an alkali metal alcoholate. By this process 3β:17α-dihydroxy-allopregnane-20-one is obtained in a yield of 80 to 90% of the theoretical, calculated from the $\Delta^{5,17(20)}$-3:20-diacyloxy-pregnadiene used as starting material.

The following Examples illustrate the present process.

Example 1

1.0 gram of a crystalline mixture of the two 20-isomeric $\Delta^{5,17(20)}$-3β:20-diacetoxy-16α-methyl-pregnadienes is dissolved in 30 cc of tetrahydrofuran, treated with 150 mg. of 10% palladium carbon catalyst and 50 mg. of oxalic acid, and stirred under hydrogen at 30° C. After 8 hours the amount of hydrogen calculated for 1 molecular equivalent has been taken up. 0.5 cc. of pyridine is added, the catalyst is filtered off and rinsed with methylene chloride, and the filtrate is evaporated to dryness in a water-jet vacuum. The residue (1.14 grams) consists of a mixture of the two 20-isomeric $\Delta^{17(20)}$-3β:20-diacetoxy-16α-methyl-allopregnenes.

960 mg. of this crude enol acetate are dissolved in 4.0 cc. of molar ethereal monoperphthalic acid solution and maintained for 2 days at 25° C. The solution is then diluted with 60 cc. of ether, the ethereal solution is washed with sodium bicarbonate solution and water, dried and evaporated in a water-jet vacuum.

The residue (1.30 grams) crystallizes on addition of a small amount of methanol; it is dissolved in 40 cc. of methanol, treated with a solution of 500 mg. of potassium carbonate in 10 cc. of water, and the whole is refluxed for 2 hours, then cooled, treated with 60 cc. of water and suction-filtered. After drying, 716 mg. of pure 3β:17α-dihydroxy-16α-methyl-allopregnane-20-one are obtained.

Example 2

A solution of 10 grams of the crystalline mixture of the two 20-isomeric $\Delta^{5,17(20)}$-3β:20-diacetoxy - 16α - methyl pregnadienes in 200 cc. of rectified spirit is treated with 1.0 gram of 10% palladium carbon catalyst and agitated for 8 hours under hydrogen, after which time the absorption of hydrogen ceases almost completely. The catalyst is suctioned off, the filter residue is rinsed with methylene chloride, and the filtrate evaporated to dryness in a water-jet vacuum.

The crude hydrogenation product is dissolved in 40 cc. of molar ethereal monoperphthalic acid solution and kept for 3 days at 25° C., during which time phthalic acid separates in colorless crystals. The whole is diluted with 200 cc. of ether, the ethereal solution is decanted from the precipitate, washed with sodium bicarbonate solution and water, dried and evaporated to dryness.

The residue is dissolved in 400 cc. of methanol, treated with a solution of 5.0 grams of potassium carbonate in 100 cc. of water, and refluxed for 2 hours under nitrogen. The reaction product begins to crystallise after a short time. After lapse of the reaction time, 300 cc. of water are added, the whole is allowed to cool and then suction-filtered, to yield an almost pure crude product melting at 226–230° C. By recrystallization from methanol a total of 6.90 grams of pure 3β:17α-dihydroxy-16α-methyl-allopregnane-20-one, melting at 232–235° C., is obtained in two fractions. Yield: 82% of theory.

In a completely analogous manner 3β:17α-dihydroxy-16α-methyl-allopregnane-20-one (melting at 232–235° C.) is obtained from $\Delta^{5:17(20)}$-3β:20-dipropionyloxy-16α-methyl-pregnadiene in a yield of 85%, and from $\Delta^{5:17(20)}$-3β-capryloxy-20-acetoxy-16α-methyl - pregnadiene in a yield of 80%.

What is claimed is:

1. Process for the manufacture of 3β:17α-dihydroxy-16α-lower alkyl-allopregnane-20-ones, wherein a $\Delta^{5:17(20)}$-3:20-diacyloxy-16α-lower alkyl-pregnadiene is hydrogenated in the presence of a palladium catalyst, the hydrogenation product is treated with an organic peracid and the resulting oxidation product hydrolysed.

2. Process as claimed in claim 1, wherein a $\Delta^{5:17(20)}$-3:20-diacyloxy-16α-methyl-pregnadiene is used as starting material.

3. Process as claimed in claim 1, wherein $\Delta^{5:17(20)}$-3:20-diacetoxy-16α-methyl-pregnadiene is used as starting material.

4. In the process claimed in claim 1 the step which comprises the selective hydrogenation of the 5:6-double bond in a $\Delta^{5:17(20)}$-diacyloxy-16α-lower alkyl-pregnadiene.

5. In the process claimed in claim 1 the step which comprises the selective hydrogenation of the 5:6-double bond in a $\Delta^{5:17(20)}$-diacyloxy-16α-methyl-pregnadiene.

6. In the process claimed in claim 1 the step which comprises the selective hydrogenation of the 5:6-double bond in $\Delta^{5:17(20)}$-diacetoxy-16α-methyl-pregnadiene.

References Cited in the file of this patent

UNITED STATES PATENTS

| | | |
|---|---|---|
| 2,783,252 | Schmidt-Thomé | Feb. 26, 1957 |
| 2,786,856 | Cutler et al. | Mar. 26, 1957 |
| 2,794,034 | Ruschig et al. | May 28, 1957 |

OTHER REFERENCES

Oliveto et al.: 80 JACS, 4431 (1958).